(12) United States Patent
Glasser

(10) Patent No.: US 11,281,633 B2
(45) Date of Patent: *Mar. 22, 2022

(54) SYSTEM AND METHOD FOR INFORMATION STORAGE USING BLOCKCHAIN DATABASES COMBINED WITH POINTER DATABASES

(71) Applicant: Avery Glasser, Munich Bavaria (DE)

(72) Inventor: Avery Glasser, Munich Bavaria (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/335,338

(22) Filed: Jun. 1, 2021

(65) Prior Publication Data

US 2021/0286774 A1 Sep. 16, 2021

Related U.S. Application Data

(63) Continuation of application No. 16/598,006, filed on Oct. 10, 2019, now Pat. No. 11,023,423.

(51) Int. Cl.
*G06F 16/182* (2019.01)
*G06F 21/32* (2013.01)
*G06F 16/13* (2019.01)
*H04L 9/06* (2006.01)

(52) U.S. Cl.
CPC ........ *G06F 16/1837* (2019.01); *G06F 16/134* (2019.01); *G06F 21/32* (2013.01); *H04L 9/0637* (2013.01)

(58) Field of Classification Search
None
See application file for complete search history.

(56) References Cited

U.S. PATENT DOCUMENTS 10,116,657 B2 10/2018 Andrade
2016/0308855 A1 10/2016 Lacey et al.
2019/0068367 A1 2/2019 Baughman et al.

*Primary Examiner* — Tony Mahmoudi
*Assistant Examiner* — Umar Mian
(74) *Attorney, Agent, or Firm* — Galvin Patent Law LLC; Brian R. Galvin

(57) ABSTRACT

A system and method for information storage using blockchain and pointer databases, comprising a computer with a blockchain manager and datastore manager, and blockchain data input, which connects over a network to a distributed blockchain ledger containing information such as personally-identifying data and a datastore system containing searchable information such as a DNS system on the persons entered into the blockchain, the datastore system also containing reference numbers for each searchable block in the blockchain, such that verification or identification can both be accomplished swiftly and securely of data in the blockchain such as for data verification to verify or identify persons submitting data to such a system.

2 Claims, 10 Drawing Sheets

SYSTEM AND METHOD FOR INFORMATION STORAGE USING BLOCKCHAIN DATABASES COMBINED WITH POINTER DATABASES

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/598,006

BACKGROUND OF THE INVENTION

Field of the Art

The disclosure relates to the field of information storage and security, and more specifically to the combination of blockchain databases with pointer databases to increase security and decrease bandwidth and storage requirements.

Discussion of the State of the Art

Blockchain databases have some tremendous advantages, such as immutability of records and decentralized storage and verification of transactions. However, they also have some tremendous disadvantages in terms of database size and lack of searchability. The size of blockchain databases requires substantial bandwidth and storage space to download and store the entire blockchain which prevents or substantially limits their use on mobile devices. Further, while certain records in a blockchain database can be identified, information contained in the records of blockchain databases is not searchable. Therefore, unless one knows the particular record in which information can be found, it's not possible to find information stored in a blockchain database.

What is needed is a system and methods for information storage using blockchain and pointer databases, wherein information such as biometric information is securely and unalterably stored in encrypted form on a distributed blockchain, and wherein the information stored in the distributed blockchain is made searchable and accessible by storing pointers to each block in the blockchain and searchable text descriptors are stored in a text-based domain name system.

SUMMARY OF THE INVENTION

Accordingly, the inventor has conceived and reduced to practice systems and methods for information storage using blockchain databases in connection with pointer databases. The following non-limiting summary of the invention is provided for clarity, and should be construed consistently with embodiments described in the detailed description below. In the system and method, user data is securely and unalterably stored in encrypted form on a distributed blockchain, and pointers to each block in the blockchain and searchable text descriptors are stored in a text-based domain name system, such that the pointers in the domain name system can be searched to identify specific blocks in the blockchain for use, decreasing the bandwidth required for both storage and transmission of this secure data.

According to a preferred embodiment, a system for information storage using blockchain and pointer databases is disclosed, comprising: a user portal comprising a first plurality of programming instructions operating on a computing device and configured to: receive data from a user; receive identification information for the user; encrypt the data and identification information; create a block for insertion into a blockchain, the block comprising the encrypted data and identification information, and a block identifier; create a searchable pointer database record for the block comprising the block identifier and searchable text descriptor of the data and at least a portion of the identification information contained in the block; transmit the block to a blockchain manager; and transmit the record to a pointer database manager; and a blockchain manager comprising a second plurality of programming instructions operating on the computing device and configured to: receive the block from the user portal; if the computing device is connected to a network, transmit the block to be appended to a distributed blockchain; if the computing device is not connected to a network, store the block in a queue for later appending to the distributed blockchain; a pointer database manager comprising a third plurality of programming instructions operating on the computing device and configured to: receive the record from the user portal; if the computing device is connected to a network, transmit the record for incorporation into a domain name system; and if the computing device is not connected to a network, store the record in a queue for later incorporation into a domain name system.

According to another preferred embodiment, a method for information storage using blockchain and pointer databases is disclosed, comprising the steps of: receiving data from a user; receiving identification information for the user; encrypting the data and identification information; creating a block for insertion into a blockchain, the block comprising the encrypted data and identification information, and a block identifier; creating a searchable pointer database record for the block comprising the block identifier and searchable text descriptor of the data and at least a portion of the identification information contained in the block; if network connectivity is available, transmit the block to be appended to a distributed blockchain and transmit the record for incorporation into a domain name system; and if network connectivity is unavailable, store the block in a queue for later appending to the distributed blockchain and store the record in a queue for later incorporation into a domain name system.

According to an aspect of an embodiment, the data comprises biometric data of the user.

According to an aspect of an embodiment, the system is configured to retrieve stored data, comprising: a fourth plurality of programming instructions operating on the computing device and configured to: receive a text descriptor from the user; query the pointer database manager with the text descriptor; query the blockchain manager for any returned block numbers received from the pointer database manager; decrypt the returned block from the blockchain manager; display the decrypted block contents to the user.

According to an aspect of an embodiment, the system is configured to verify biometric data, comprising: a fourth plurality of programming instructions for the verification terminal, which cause the computing device to: receive the text descriptor, wherein the text descriptor comprises identifying information of the user; capture biometric data from the user, the biometric data being of the same sort already stored from the user with the verification terminal; query the pointer database manager with the text descriptor; query the blockchain manager for any returned block numbers received from the pointer database manager; decrypt the returned block from the blockchain manager; compare the stored biometric data from the returned block with the captured biometric data from the user; return a confirmation if the compared biometric data matches.

According to an aspect of an embodiment, a method is provided wherein the previous method is configured to verify biometric data, the modified method further comprising the steps of: receiving identifying information from the user other than biometric data, using a verification terminal; capturing biometric data from the user, the biometric data being of the same sort already stored from the user with the verification terminal, using a verification terminal; querying the domain name system manager with the text of the text descriptor of the biometric information and the at least a portion of identification information contained in the text record, using a verification terminal; querying the blockchain manager for any returned block numbers received from the domain name system manager, using a verification terminal; decrypting the returned block from the blockchain manager, using a verification terminal; comparing the stored biometric data from the returned block with the captured biometric data from the user, using a verification terminal; receiving queries from a verification terminal, using a blockchain manager; return blocks of data from a blockchain to a verification terminal when requested, using a blockchain manager; receiving queries from a verification terminal, using a domain name system manager; and returning searchable records to a verification terminal matching a text search performed by a verification terminal using, using a domain name system manager.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
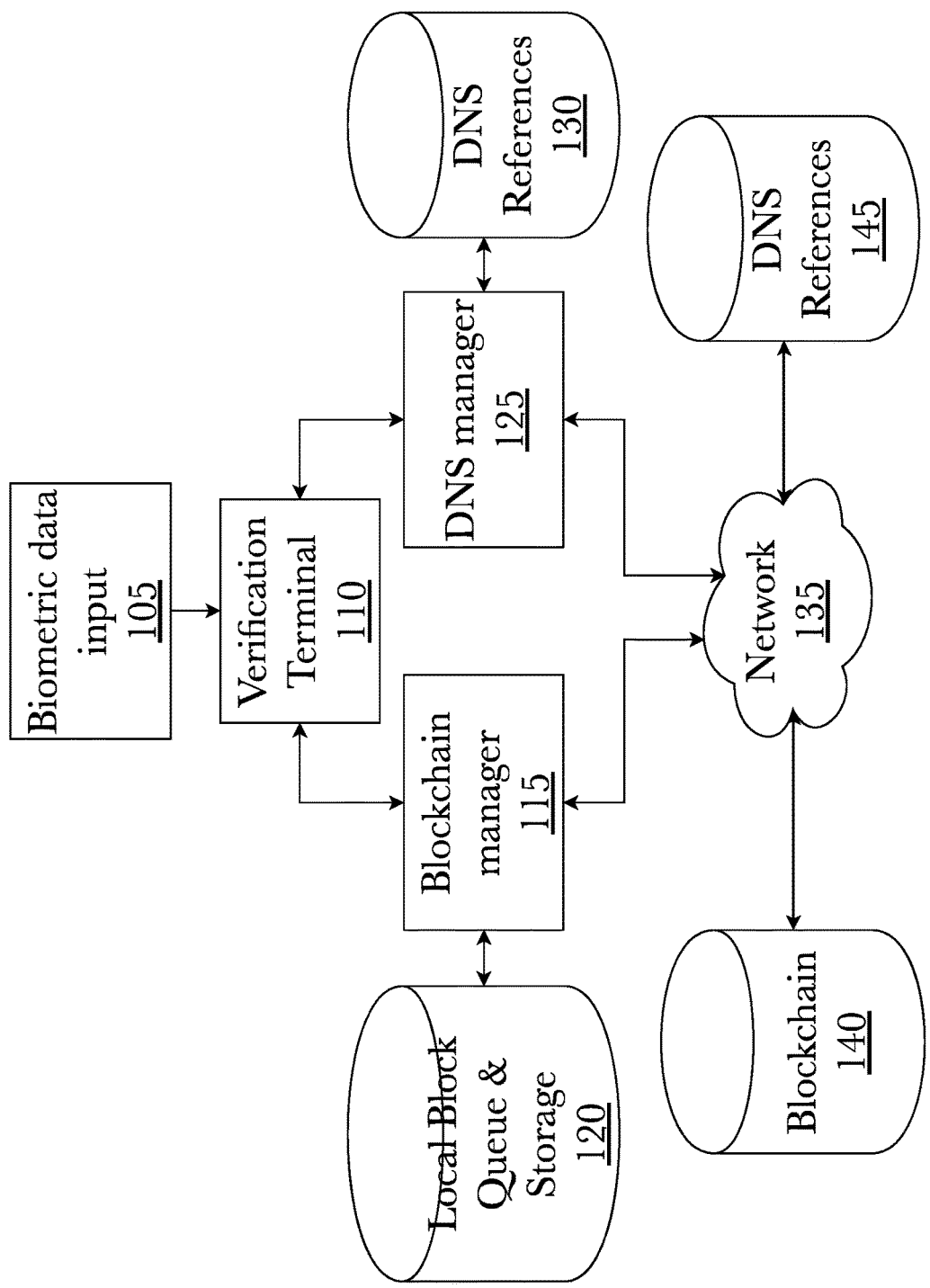
FIG. 1 is a block diagram of a system for information storage using blockchain and pointer databases, including both local and network-connected blockchain and DNS reference stores.

The inventor has conceived, and reduced to practice, system and method for information storage using blockchain databases combined with pointer databases.

As noted previously, the size of blockchain databases presents a problem to their usage on bandwidth limited or computationally-limited computing devices (e.g. mobile phones). Additionally, searching a blockchain, even where possible, can be very slow and computationally intensive. It requires the search to have access to a full version of the blockchain with access to plain text. This makes the searching of encrypted data problematic. Further, if a whole blockchain is loaded, not only is the data large, but if the device is compromised then all biometric data could be compromised which is highly problematic for data security and data protection compliance. So, whilst blockchain technology has many benefits for data security and ensuing compliance of the data, it is problematic where storage and computation may be limited.

The solution to the secure blockchain data storage problem presented herein is to use blockchains in combination with a searchable text datastore, in some embodiments provided herein this is accomplished with domain name system (DNS) technology. DNS is a hierarchical decentralized naming system for computers, services, or other resources connected to the Internet or a private network. DNS has the benefit of being a lightweight, self-distributing, self-updating system and is used extensively to translate canonical names (e.g.: www.yahoo.com) to an IP address. DNS also implements mechanisms to define authority and access. It is very fast and can be implemented locally as a lightweight process on a computer, mobile device or as a dedicated server.

One use case for this invention is the secure storage of the biometric templates or biometric information; especially in situations where communications are constrained and may be intermittent and where store and computational resources are limited, such as in mobile applications and mobile devices.

An identity verification can only be trusted if the biometric template against which a person's identity is being check is also trusted. Further, in many biometric technologies, such as in voice biometric technologies, the template needs to be constantly updated to maintain the accuracy of the template as personal biometric information changes over time.

Further the size of the biometric template (or data blob) can be large. Consequently, it is not always possible to store large amounts of biometric templates on devices with limited storage capabilities. What is more, biometric information is classified as sensitive personal information and storing this data locally on a device can also lead to security being compromised and the solutions not being compliant with emerging data protection regulations such as GDPR in Europe.

While many of the examples contained in the instant application relate to secure storage of biometric information, these examples should not be considered limiting. The invention described herein can be used to securely store and verify any encrypted information contained in any blockchain, along with the use of other text and searchable datastores other than DNS, provided the searchability and propagation needs are met, DNS being a currently-existing system capable of providing these functionalities, hence their usage in some embodiments and examples herein.

In addition, for the purpose of biometric storage and identification or verification, numerous differing methodologies and biometric templates may be used, specific biometric information such as fingerprints or voice prints being used in exemplary methods herein but which are not limiting and only meant to illustrate the use of biometric information storage capable in the system. It is possible for this system to operate effectively with any biometric information, and for that information to be provided by any number of biometric scanning technologies or engines, the invention herein being only a system for secure storage and efficient searching and updating of records such as biometric records.

Further, the DNS standard also allows small amounts of text storage as per the RFC 1035 3.3.14 definition. This is usually used to store domain names used in a DNS system. However, in this invention this is used to point to the blocks in the blockchain thereby mitigating the problem with using blockchain technology for biometric storage, namely managing and processing the large blockchains and the security problems associated with exposing the blockchain information as clear text.

Importantly, blockchain is designed to be replicated across various networks and device types. Background engines on computers, mobile devices or server clouds can be set to constantly fetch records as they are written making Blockchain a useful technology for biometric applications in mobile devices and cloud computing environments.

In some embodiments, the system may use a third party biometric engine (such as a voice biometric engine that converts spoken audio into biometric representations known as "voice prints"). In some embodiments, the system may use a primary DNS domain such as *.biodata, where optional biometric modalities can be specified as subdomains to the primary DNS domain (e.g.: *.voice.biodata for voice biometric data, *.fingerprint.biodata for fingerprint biometric data).

The invention offers many benefits, specifically that an operator working on identification (searching for a voice match of an unknown sample) of another person may do so more swiftly and easily with this system, and a system loaded with biometric templates that are coded solely to a blockchain record can be passed to another operator who may use DNS search tools to find which subject the record matches to. Automated biometrics systems can get lists of records to download, batching them for when data is available, specify themselves to only have a specific zone in the DNS system, and more, for increased on-site security and increased searchability of data.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Blockchain" as used herein means a digital database operated on a decentralized computing network comprised of individual computers called blocks, which validate transactions, and wherein consensus of validating blocks is required to confirm entries into the database. Blockchains are typically operated on large, decentralized computing networks, which are usually publicly-accessible and unmanaged. In fact, it is often the decentralized, publicly-accessible nature of a blockchain that provides its security, as no record can be changes without a consensus of computers not under the control of a potential attacker. Blockchains are designed to be permanent storage (write once, read many, or WORM) storage systems. Records or updated templates can be added to the blockchain but existing records cannot be changed, since rewriting is not permitted in a WORM storage system. For purposes of the present application, this creates a forensic trail of biometric templates that can be used to search changes and provide access to various records.

Conceptual Architecture

FIG. 1 is a block diagram of a system for information storage using blockchain and pointer databases, including both local and network-connected blockchain and DNS reference stores. A source of biometric data input 105 such as a fingerprint scanner, voice recognition system, retinal scanner, or other source of biometric data, sends data to a computer verification terminal 110 which may be a workstation, desktop computer, or some computer system specially designed for biometric verification if necessary. The input may be accomplished by a direct connection or a connection over a network. The verification terminal 110 in question maintains a blockchain manager 115 and DNS manager 125 each, which are pieces of software that respectively maintain a local block queue and storage 120 and a local datastore of biometric DNS references 130. The purpose of a blockchain manager 115 is to manage the creation of new blocks to add to a blockchain, the acquisition of blocks from a blockchain by reference number, and the management of a local block queue and storage 120 separate from a network 135 connected or distributed blockchain 140. The purpose and function of a DNS manager 125 is to communicate with a network-connected biometric DNS 145 and to maintain a local repository of DNS references 130, which is necessary for a system to operate when offline or with limited network availability. A network-connected, or distributed, blockchain 140 exists and is able to be queried by a blockchain manager 115 over a network 135, and contains more than any single source's local data. Similarly, DNS references 145 exist in a distributed form similar to DNS systems used by the Internet, but for the purpose of providing zoning based on personas required by individual systems and computers 110 such as those provided for a specific organization or location, and for the purpose of providing searchable information on persona information representing the identity of the person whose biometric information is stored. A reference number to the block in the blockchain 140 is also a part of the DNS system 145, allowing a returned result from a search to provide the reference number to the entry in the blockchain 140 for their biometric template. For instance, a persona may exist with the name "John Doe" and with a description of where he originally registered his biometric template and with what software and techniques, for instance "John Doe, fingerprint scanned using FingerPrintSoftwareXYZ at Central Bank, Los Angeles, reference number 18952," and when an individual at the Central Bank in Los Angeles searches for "John Doe Central Bank" they will get the relevant DNS result returned, enabling them to query the block 18952 from the blockchain 140, 120. This may occur using locally stored data or network-connected resources as shown, depending on the network connectivity and settings of the embodiment.

Figure 2:
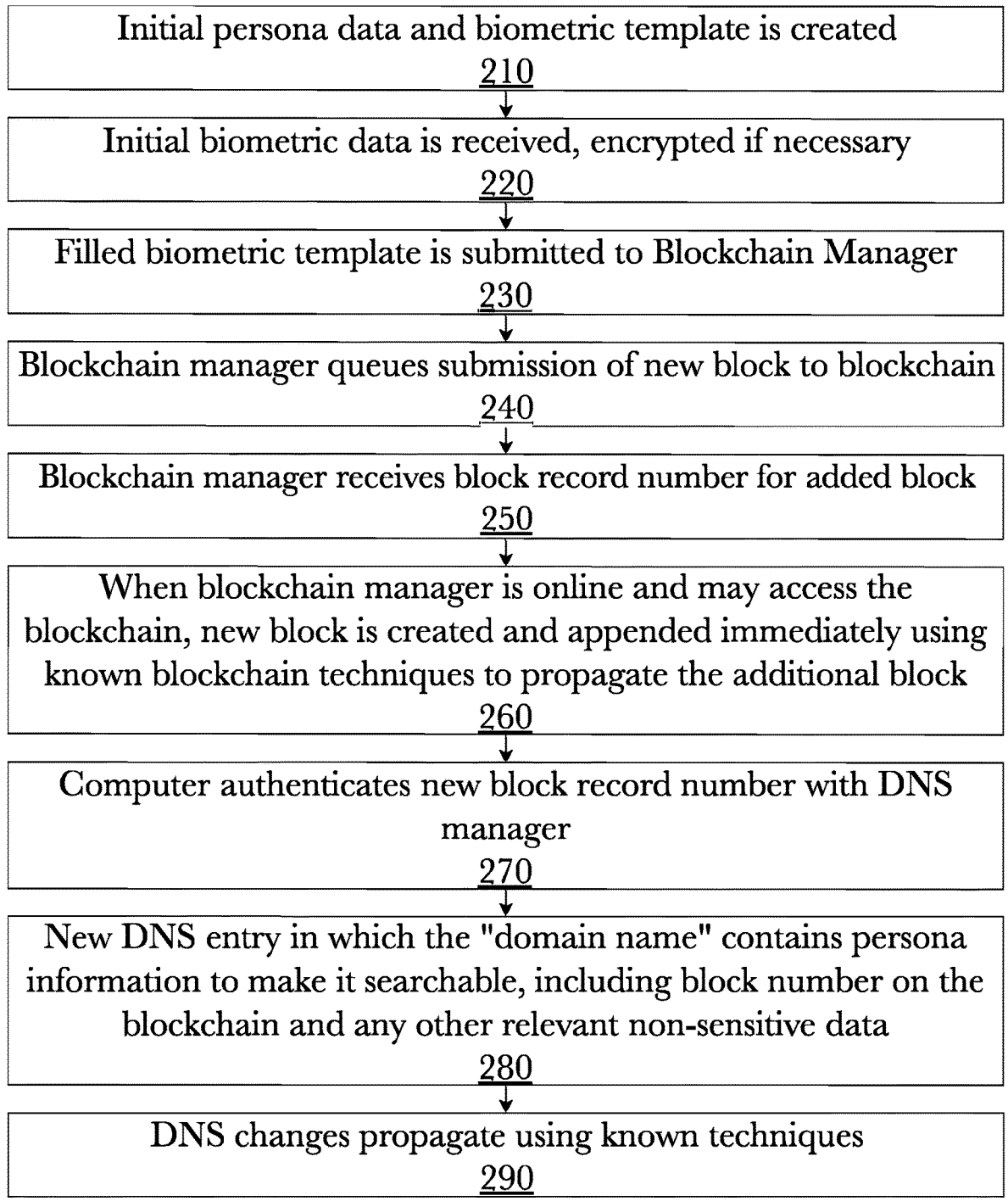
FIG. 2 is a method diagram showing the steps taken for biometric data template creation and addition to a blockchain, and DNS reference creation for biometric templates.

FIG. 2 is a method diagram showing the steps taken for biometric data template creation and addition to a blockchain, and DNS reference creation for biometric templates. First an initial persona data and biometric template is created 210, persona information containing whatever information an operator of the system determines to be meaningful and non-sensitive information about the person in question. For instance, their name and the name of the organization the operator of the system works for, as well as the type of biometric information that will be recorded, may be used as persona data, while the actual biometric information as formatted by the input system constitutes the biometric template, such as fingerprints or voice pattern recognition data. Initial biometric data is received, and encrypted if necessary 220, after the persona data is filled out, as already mentioned. Next, the filled biometric template is submitted to the blockchain manager 230 so that the blockchain manager may queue submission of the new block to the distributed blockchain 240. For instance, in the case of acoustic data such as a voice record, the operator will load the acoustic data file to the blockchain manager to be created and submitted as a new block on the blockchain, at which time the the blockchain manager then receives the block record identifier (typically a sequential number) for added block 250 from the blockchain, which represents the location of the data block in the blockchain, the block containing the encrypted biometric data. When the blockchain manager is online and may access the blockchain, the new block is created and appended immediately using known blockchain techniques to propagate the additional block 260, the blockchain propagation techniques themselves not being the core subject of the disclosed invention and being well-known in the art. After the new block is attached to the chain and the reference number for the block is known, the computer authenticates the new block record number with the DNS manager 270, verifying that the reference number is not already in-use. When this is accomplished, a new DNS entry is created in which the "domain name" contains persona information to make it searchable, including block number on the blockchain and any other relevant non-sensitive data 280, such as the person's legal name or the organization or individual performing the biometric template creation, for ease of searching, for instance "Encoder=8 KHZ acoustic data; Location=10099." This record is propagated using known techniques 290 for DNS propagation. After a block is propagated, and the DNS record is propagated, both with the pertinent and correct information, a user may be identified through this system by entering claimed identification credentials similar to those stored unencrypted in the DNS file such as "Encoder=8 KHZ acoustic data; Location=10099," have their identification matched against a DNS record, at which time the DNS record may be pulled and the information about the matching block in the blockchain is also made available. The block may then be requested from the blockchain and the data decrypted using the method it was originally used to encrypt it depending on the vendor or operator of the system, and the data may be verified using existing biometric techniques at this point. The following is an example of loading updated voice prints. A machine learning algorithm is applied to generate an updated voiceprint using new audio sample. An operator loads the updated voice print into the blockchain (real time or batch when network is available). The blockchain starts propagating this new record across the network. The operator receives a blockchain record number that contains the voice template (e.g.: 23321), and modifies the DNS text record for the previous encoded template, changing template location and date of generation on the blockchain (e.g.: "BioEngine17-2';Location=23321; Date=230224Z22072018"), which DNS then propagates through the network.

Figure 3:
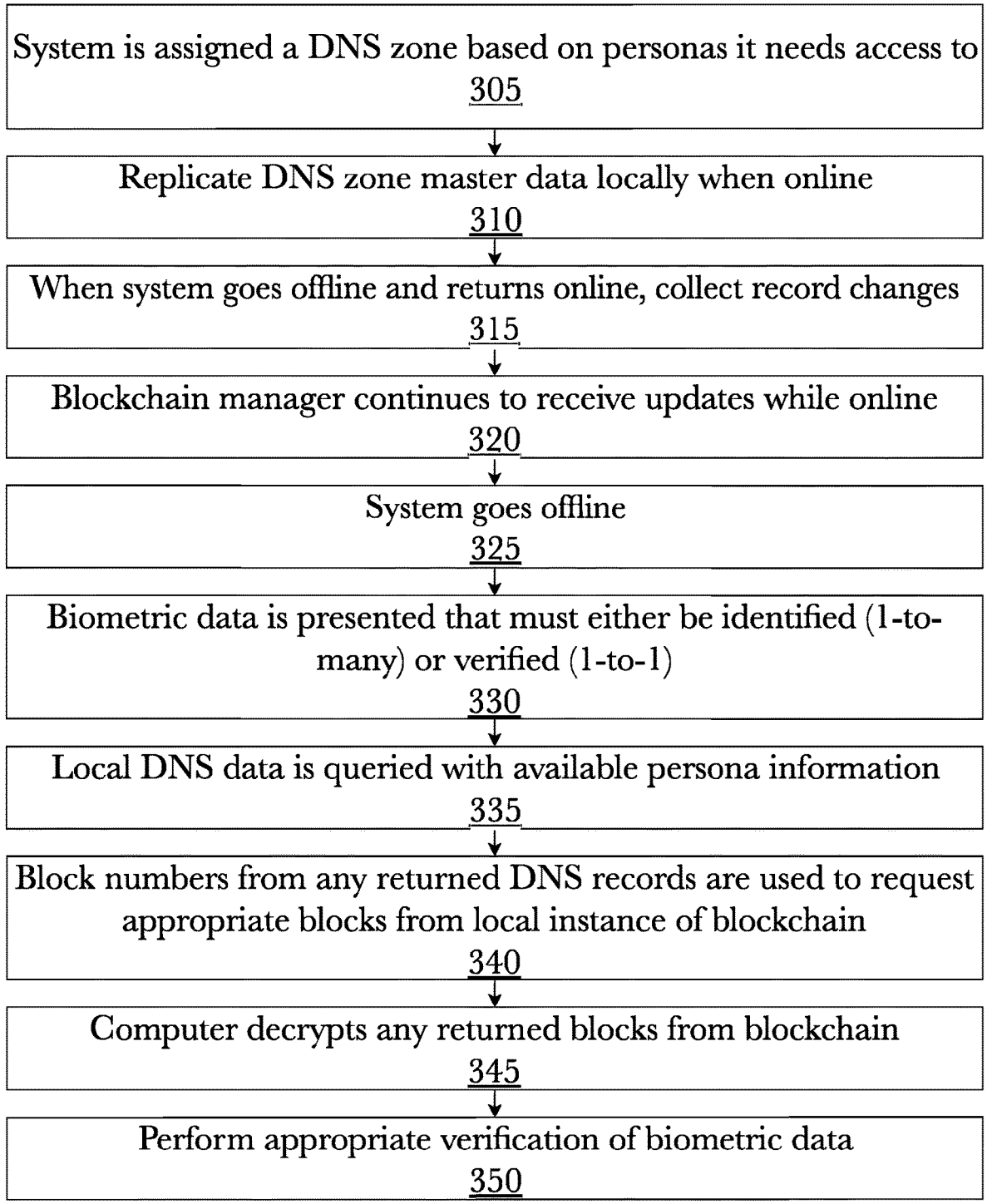
FIG. 3 is a method diagram showing the steps for offline storage of biometric blockchain and DNS information.

FIG. 3 is a method diagram showing the steps for offline storage of biometric blockchain and DNS information. The system is first assigned a DNS zone based on personas it needs access to 305, in much the same way that a DNS zone is a portion of the domain name space in the Internet DNS, where administrative responsibilities for a zone are delegated to a single manager. The computer operating the DNS manager then replicates DNS zone master data locally when online 310, meaning that while still initially online, the zone master data is copied to the local DNS reference datastore, as necessary for the appropriate DNS zone the computer is in. If at any time the system goes offline and returns online, it collects record changes 315. The local block queue and storage manager continues to receive updates while online 320, until the system goes offline 325. While the system is still offline, biometric data may be presented that must either be identified (1-to-many) or verified (1-to-1) 330. Local DNS data is then queried with available persona information 335, for instance searching the local DNS reference datastore or cache for entries with the same legal name as the person needing verification, or matching certain markers of the biometric data with what is recorded in the DNS reference when identifying an individual. Block numbers from any returned DNS records are used to request appropriate blocks from the local block queue and storage with the blockchain manager 340, before the computer decrypts any returned blocks from blockchain 345. An operator may manually, or the computer may automatically, then perform appropriate verification of biometric data 350, whether verifying a person or identifying them. The following example of verification assumes that the speaker has the identity named "subject2994." In this example, a subject may enter claimed identification credential (ID number, phone number). An operator may check the identification credentials in local database, matching the subject's identity credentials matched against a particular stored identity profile (e.g., "subject2994"). The voice biometric app checks DNS for voice.subject2994.biodata. DNS responds with the following TXT records: "Encoder='BioEngine17';Location=23321;Date=230224Z22072018," and "Encoder=WAV8 KHZ;Location=10099," which indicate that the encoding engine used, the location of the records, a date stamp, and the audio quality. Voice verification is performed using the encrypted blockchain record associated with that DNS record.

Figure 4:
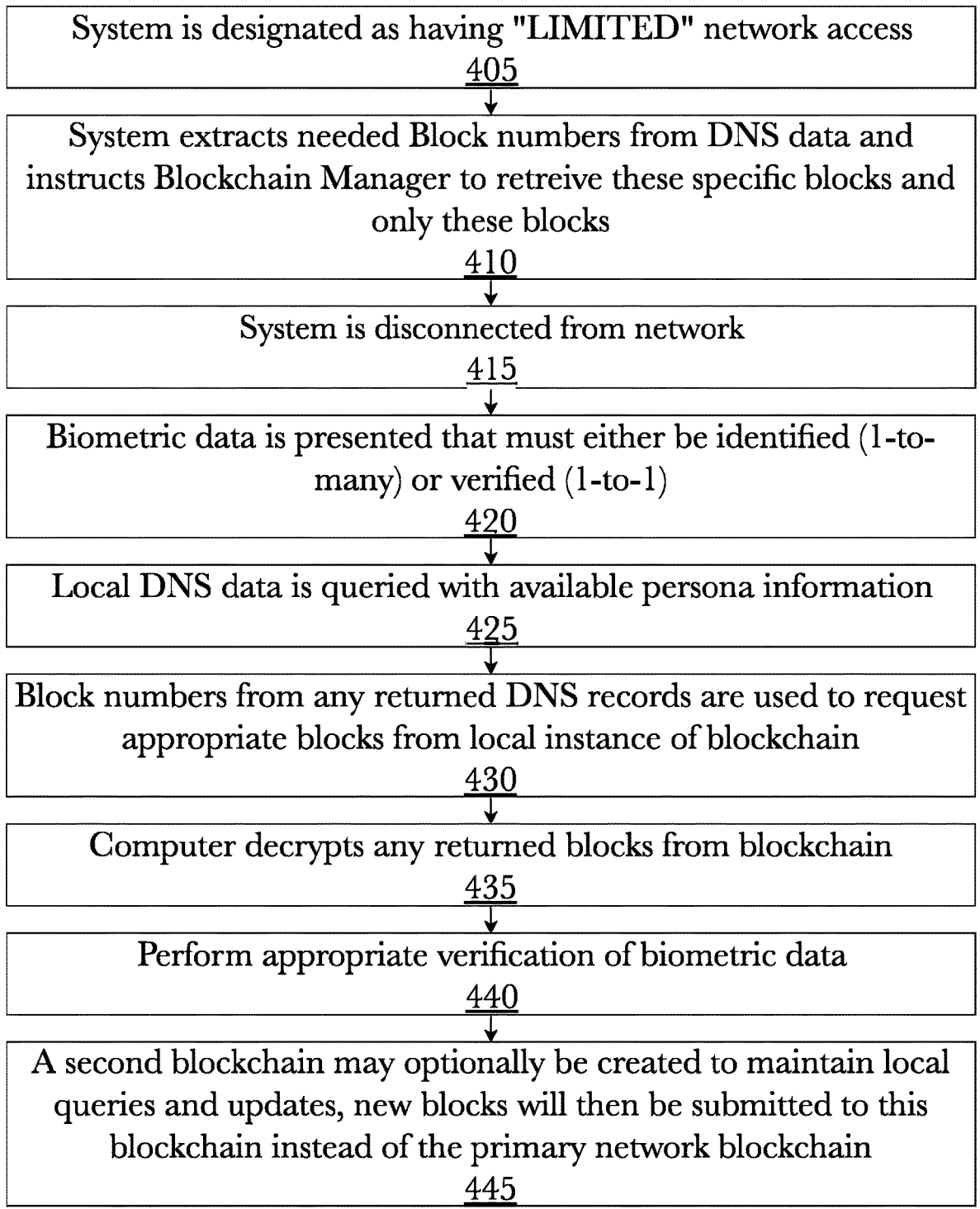
FIG. 4 is a method diagram showing the steps for acquiring partial blockchain DNS references for a limited access environment.

FIG. 4 is a method diagram showing the steps for acquiring partial blockchain DNS references for a limited access environment. An implementation of the system comprising the local computer and blockchain manager, DNS manager, and their respective datastores may be designated as having "limited" network accessibility, whether this is for security purposes, due to bandwidth issues, or some other concern 405. Based on the DNS zone and possibly the specifically specified DNS references and blockchain blocks, the system only queries and copies locally the necessary blocks and DNS references, and no others 410, before the system, might go offline 415. While the system is still offline, biometric data may be presented that must either be identified (1-to-many) or verified (1-to-1) 420. Local DNS data is then queried with available persona information 425, for instance searching the local DNS reference datastore or cache for entries with the same legal name as the person needing verification, or matching certain markers of the biometric data with what is recorded in the DNS reference when identifying an individual. Block numbers from any returned DNS records are used to request appropriate blocks from the local block queue and storage with the blockchain manager 430, before the computer decrypts any returned blocks from blockchain 435. An operator may manually, or the computer may automatically, then perform appropriate verification of biometric data 440, whether verifying a person or identifying them. A second blockchain may optionally be created to maintain local queries and updates, new blocks will then be submitted to this blockchain instead of the primary network blockchain as necessary 445.

Figure 5:
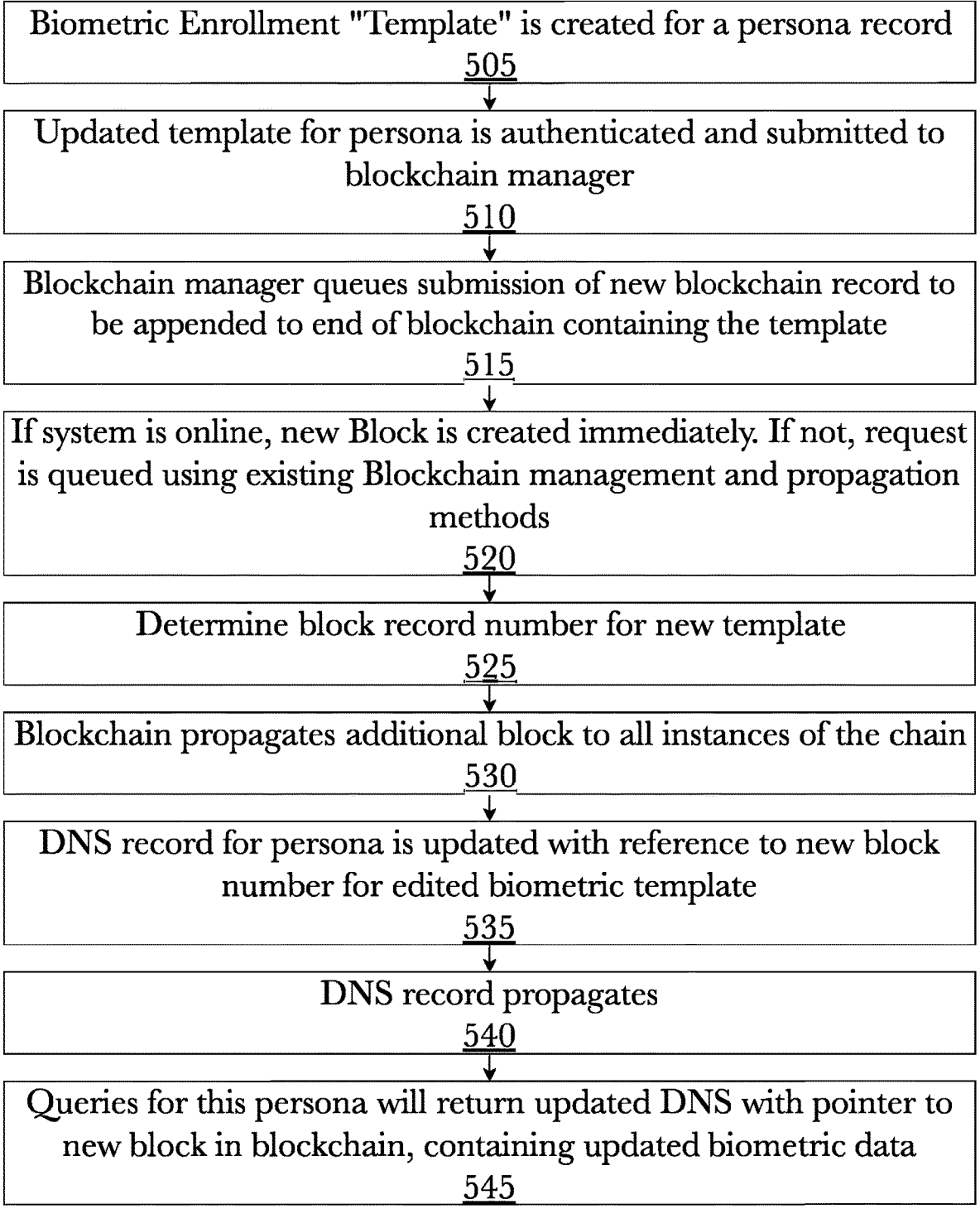
FIG. 5 is a method diagram showing the steps for updating a biometric information record of a persona in the blockchain, and updating DNS records to point to newest block containing updated biometric template.

FIG. 5 is a method diagram showing the steps for updating a biometric information record of a persona in the blockchain, and updating DNS records to point to newest block containing updated biometric template. A biometric template is created for a persona record 505, as discussed in other drawings, whereby a block in the blockchain exists which contains biometric information on an individual and a DNS record exists which contains persona information such as name or other methods of identifying the person and a reference to the block in the blockchain which contains their biometric data. Machine learning may be applied to generate an updated biometric file using new samples, for instance a new audio sample of a user speaking. When an updated template for a persona is authenticated and submitted to blockchain manager 510, such as voice biometrics being updated for someone after an event which alters their voice or if biometric data becomes invalid for some reason where the operator loads an updated voice print into the blockchain, before the blockchain manager queues submission of the new blockchain record to be appended to end of blockchain containing the template 515. If the system is online, a new block is created immediately to be queued for appending to the end of the blockchain network and local instance. If not, the request is queued using existing blockchain management and propagation methods 520. Following the creation of the new block, the computer will determine the permanent block record number for new template 525 based on the state of the blockchain network when it is next connected to the network, before the blockchain propagates additional block to all instances of the chain 530. In this way, there is not yet any indication that there has been an update to a persona, however a modified TXT record for the DNS record associated with the persona is updated with reference to the new block number and date of generation on the blockchain for the edited biometric template 535, before the DNS record propagates 540. Thereafter, queries for this persona will return the updated DNS with pointer to new block in blockchain, containing updated biometric data 545. In this way, continuity with updated information is maintained, while the blockchain continues to maintain the ledger of all previous biometric data.

Figure 6:
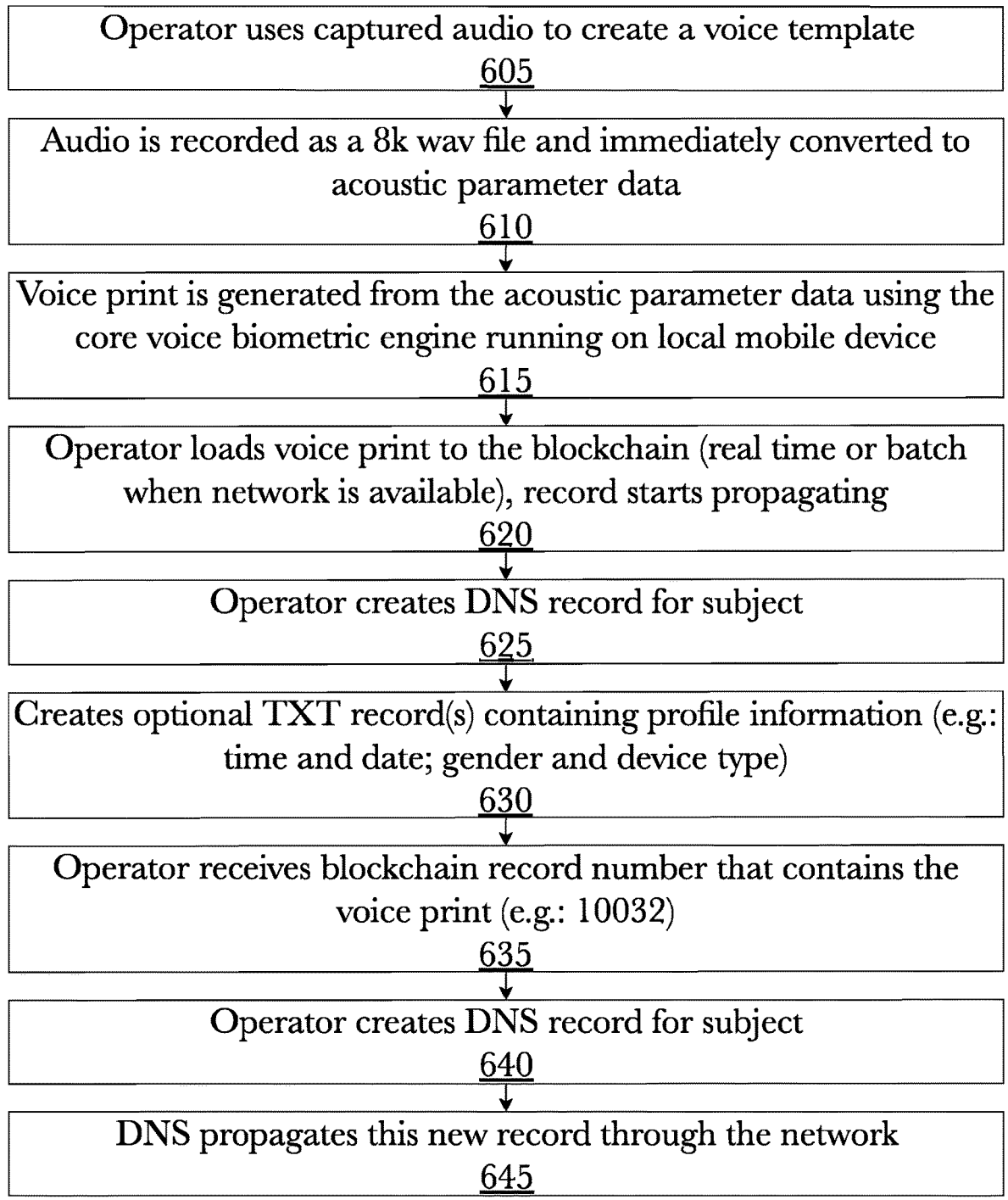
FIG. 6 shows an exemplary method for securely storing biometric voice data using blockchain and DNS.

FIG. 6 shows an exemplary method for securely storing biometric voice data using blockchain and DNS. First, an operator uses captured audio to create a voice template 605, as shown in previous embodiments where biometric data is captured from a user, before audio is recorded as an 8*k* way file and immediately converted to acoustic parameter data 610. For other embodiments as needed in the industry, other audio recording specifications may be used as necessary. A voice print is generated from the acoustic parameter data using the core voice biometric engine running on a local mobile device 615, which may be one of many possible voice biometric engines available to the operator. The operator then loads the voice print to the blockchain in real time or in a batch when the network is available, allowing the record to start propagating 620 using known blockchain methods, before the operator then creates a DNS record for the subject 625 according to earlier embodiments whereby a DNS record with a TXT record may be created containing non-sensitive identifying information of the subject and biometric capture event 630. In this way, when the DNS record is finalized and propagated, the DNS record specifying the relevant block number on the blockchain may be searched and found using certain identifying information as needed. The operator receives the blockchain record number that contains the voice print (e.g.: 10032) 635 allowing the operator to create the DNS record for the subject 640, before the DNS record propagates this new record through the network 645.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 7:
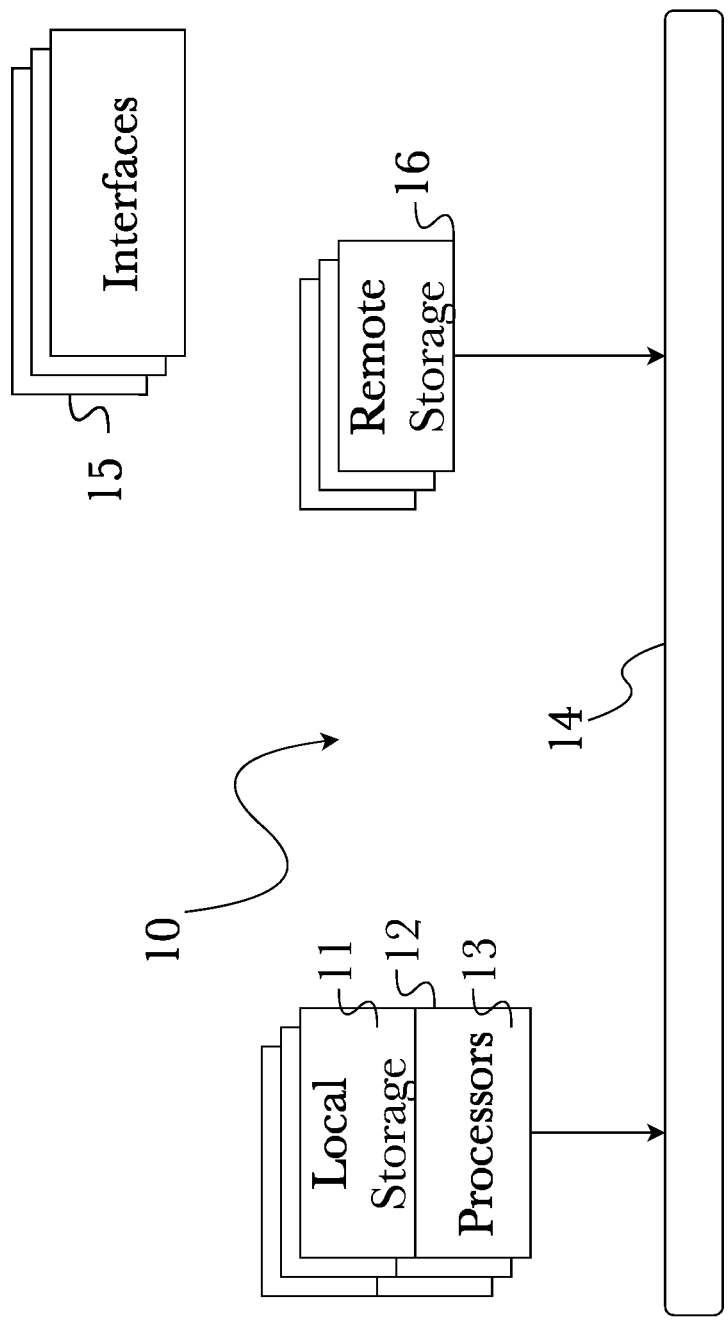
FIG. 7 is a block diagram illustrating an exemplary hardware architecture of a computing device.

Referring now to FIG. 7, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs).

Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 7 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 8:
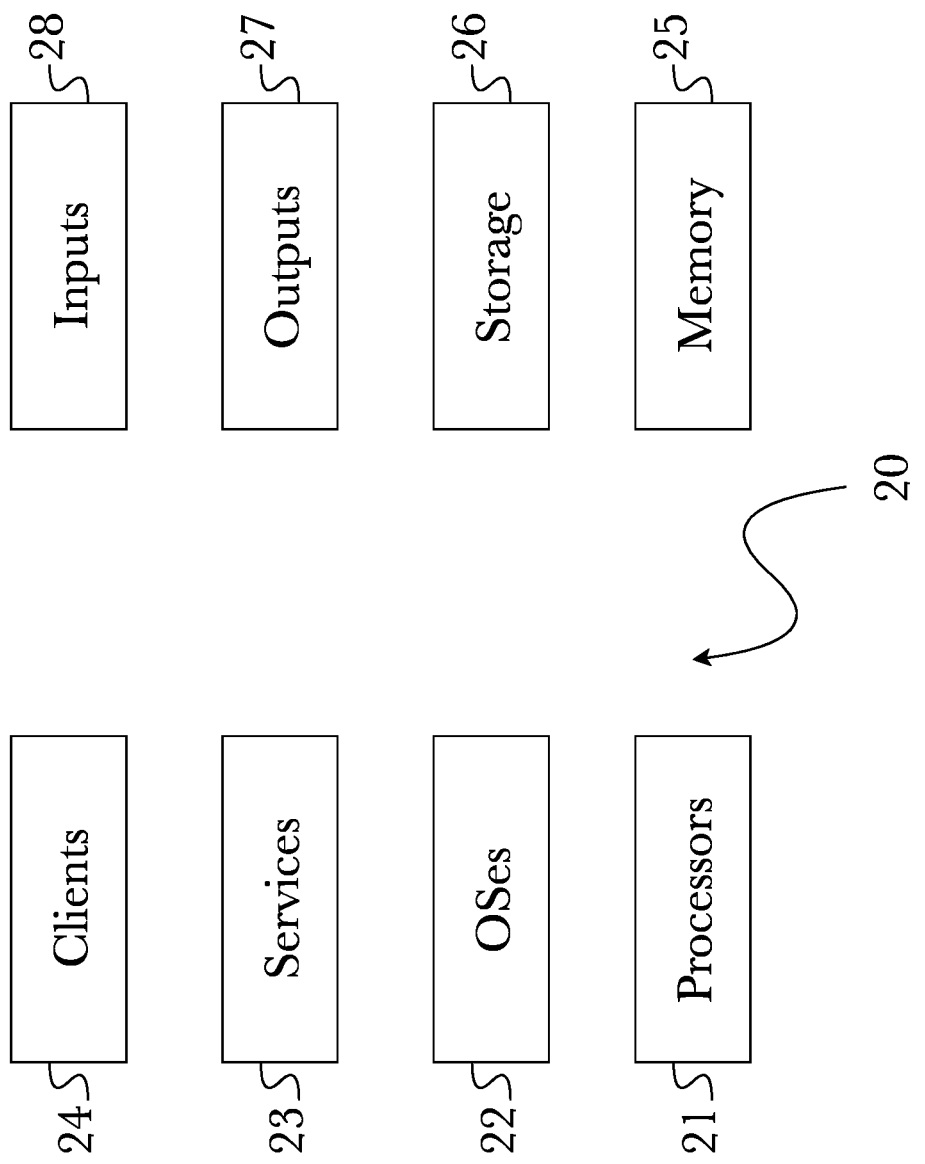
FIG. 8 is a block diagram illustrating an exemplary logical architecture for a client device.

In some embodiments, systems according to the present invention may be implemented on a standalone computing system. Referring now to FIG. 8, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 7). Examples of storage devices 26 include flash memory, magnetic hard drive, CD-ROM, and/or the like.

Figure 9:
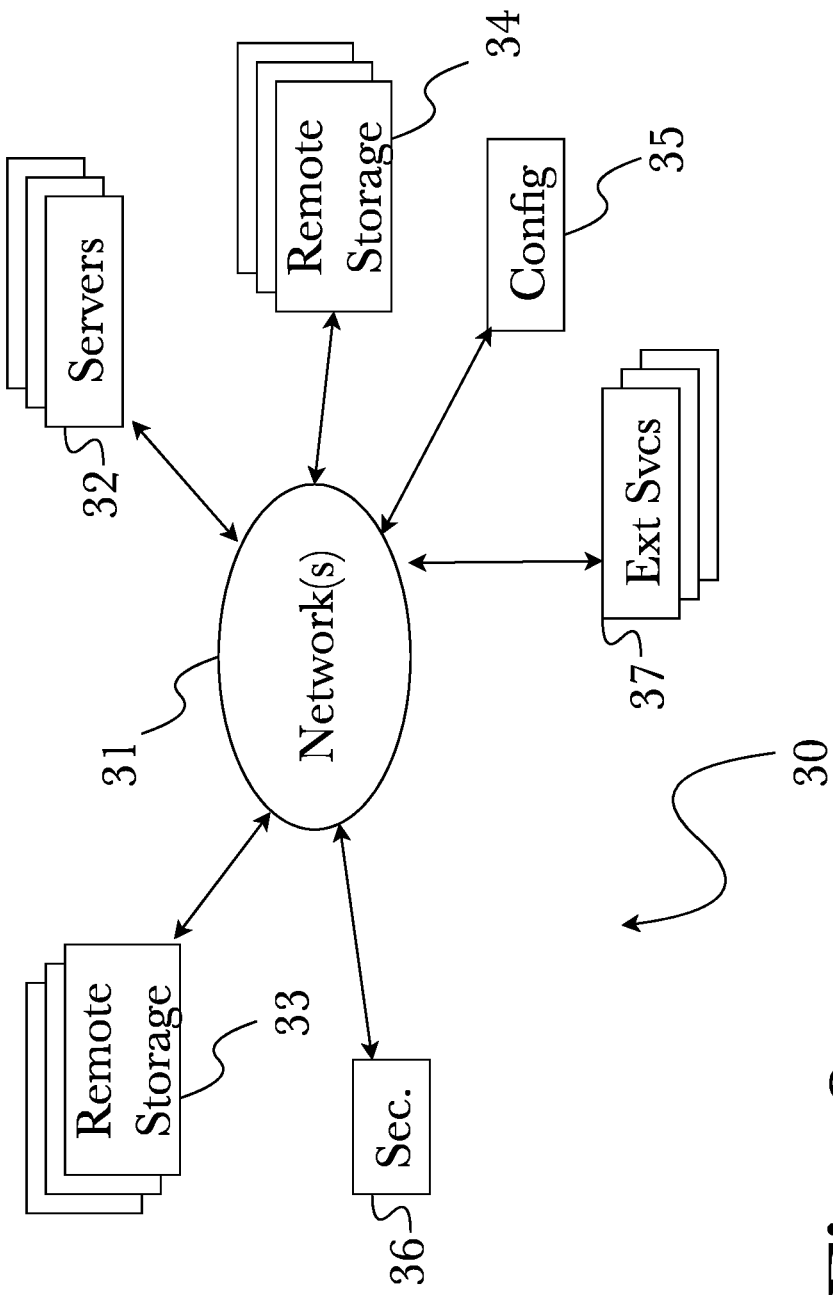
FIG. 9 is a block diagram showing an exemplary architectural arrangement of clients, servers, and external services.

In some embodiments, systems of the present invention may be implemented on a distributed computing network, such as one having any number of clients and/or servers. Referring now to FIG. 9, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 8. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 10:
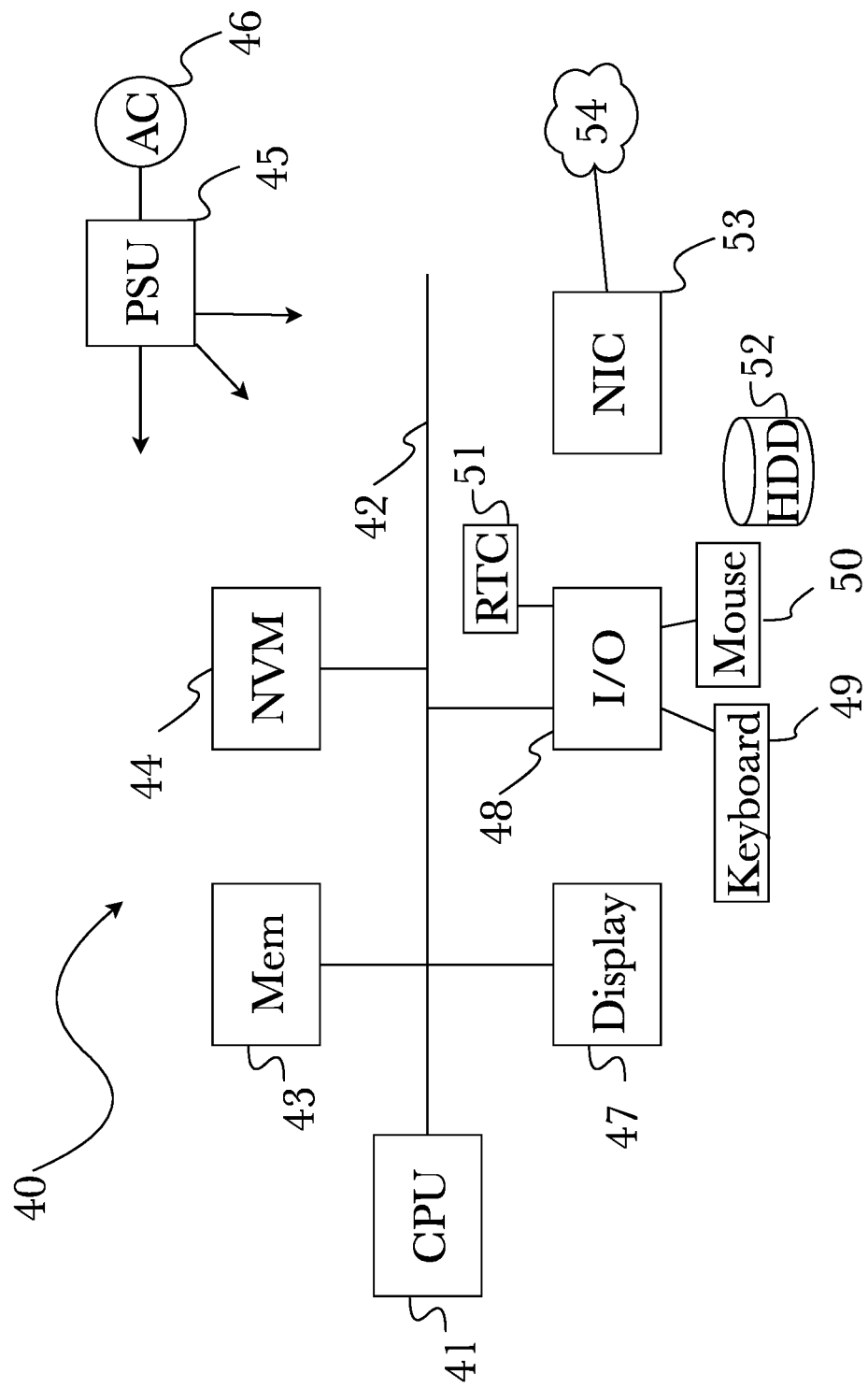
FIG. 10 is another block diagram illustrating an exemplary hardware architecture of a computing device.

FIG. 10 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for information storage and retrieval using blockchain and pointer databases, comprising:
   a user portal comprising a first plurality of programming instructions stored in a memory of, and operating on a processor of, a computing device, wherein the first plurality of programming instructions, when operating on the processor, causes the processor to:
   receive data from a user;
   receive identification information for the user;
   encrypt the data and identification information;
   create a block for insertion into a blockchain, the block comprising the encrypted data and identification information, and a block identifier;
   create a searchable pointer database record for the block comprising the block identifier and searchable text descriptor of the data and at least a portion of the identification information contained in the block;
   transmit the block to a blockchain manager; and
   transmit the record to a pointer database manager;
   a blockchain manager comprising a second plurality of programming instructions stored in the memory and operating on the processor of the computing device, wherein the second plurality of programming instructions, when operating on the processor, causes the processor to:
receive the block from the user portal;
if the computing device is connected to a network, transmit the block to be appended to a distributed blockchain;
if the computing device is not connected to a network, store the block in a queue for later appending to the distributed blockchain;
a pointer database manager comprising a third plurality of programming instructions stored in the memory and operating on the processor of the computing device, wherein the third plurality of programming instructions, when operating on the processor, causes the processor to:
receive the record from the user portal;
if the computing device is connected to a network, transmit the record for incorporation into a domain name system; and
if the computing device is not connected to a network, store the record in a queue for later incorporation into a domain name system;
a data retriever comprising a fourth plurality of programming instructions stored in the memory and operating on the processor of the computing device, wherein the fourth plurality of programming instructions, when operating on the processor, causes the processor to:
receive a text descriptor from the user;
query the pointer database manager with the text descriptor;
query the blockchain manager for any returned block numbers received from the pointer database manager;
decrypt the returned block from the blockchain manager; and
display the decrypted block contents to the user; and
a data verifier comprising a fifth plurality of programming instructions stored in the memory and operating on the processor of the computing device, wherein the fifth plurality of programming instructions, when operating on the processor, causes the processor to:
receive the text descriptor, wherein the text descriptor comprises identifying information of the user;
capture data from the user, the data being of the same type already stored from the user with the verification terminal;
query the pointer database manager with the text descriptor;
query the blockchain manager for any returned block numbers received from the pointer database manager;
decrypt the returned block from the blockchain manager;
compare the stored data from the returned block with the captured data from the user; and
return a confirmation if the compared data matches the stored data.

2. A method for information storage and retrieval using blockchain and pointer databases, comprising the steps of:
receiving data from a user;
receiving identification information for the user;
encrypting the data and identification information;
creating a block for insertion into a blockchain, the block comprising the encrypted data and identification information, and a block identifier;
creating a searchable pointer database record for the block comprising the block identifier and searchable text descriptor of the data and at least a portion of the identification information contained in the block;
if network connectivity is available, transmitting the block to be appended to a distributed blockchain and transmitting the record for incorporation into a domain name system;
if network connectivity is unavailable, storing the block in a queue for later appending to the distributed blockchain and storing the record in a queue for later incorporation into a domain name system;
receiving a text descriptor from the user, wherein the text descriptor comprises the identifying information of the user;
capturing data from the user, the captured data being of the same type already stored from the user with the verification terminal;
querying the pointer database with the text descriptor;
querying the distributed blockchain for any returned block numbers received from the pointer database;
decrypting the returned block from the distributed blockchain;
comparing the stored data from the returned block with the stored data from the user; and
displaying the decrypted block contents to the user along with a confirmation if the compared data matches the stored data.

* * * * *